J. R. C. AUGUST.
FURNACE FOR HARDENING OR TEMPERING STEEL TOOLS OR FOR HEATING OR ANNEALING METALS, GLASS, POTTERY, OR THE LIKE.
APPLICATION FILED JUNE 2, 1920.

1,432,946.  Patented Oct. 24, 1922.

Patented Oct. 24, 1922.

1,432,946

UNITED STATES PATENT OFFICE.

JOHANNES ROBERT CARL AUGUST, OF HALIFAX, ENGLAND.

FURNACE FOR HARDENING OR TEMPERING STEEL TOOLS OR FOR HEATING OR ANNEALING METALS, GLASS, POTTERY, OR THE LIKE.

Application filed June 2, 1920. Serial No. 386,090.

*To all whom it may concern:*

Be it known that I, JOHANNES ROBERT CARL AUGUST, subject of the King of Great Britain, residing at Halifax, in the county of Yorkshire and Kingdom of England, have invented certain new and useful Improvements in Furnaces for Hardening or Tempering Steel Tools or for Heating or Annealing Metals, Glass, Pottery, or the like, of which the following is a specification.

This invention has reference to furnaces for hardening or tempering steel tools, or for heating or annealing metals, glass, pottery and the like, such furnaces being of the type wherein the temperature is produced by the burning of gas in combination with air, and wherein the gas and air supply nozzles shall enter the combustion chamber of the burner at right angles in such manner that the issuing air shall be brought into intimate contact with the heated gas to effect an efficient mixing of the same.

Prior to this invention, it has been proposed to form the combustion chamber of the burner of approximately L shape, but according to the present invention, I make the combustion chamber of the burner with inclined sides, and a floor which gradually slopes upward from the end where the pipes deliver the heated air and gas to the end which communicates with the furnace. A further feature of the invention is the particular construction and disposition of the gas and air supply pipes for regeneration or pre-heating by waste flue gases.

The invention will be understood from the following description reference being had to the accompanying drawing, in which:—

Figure 2:
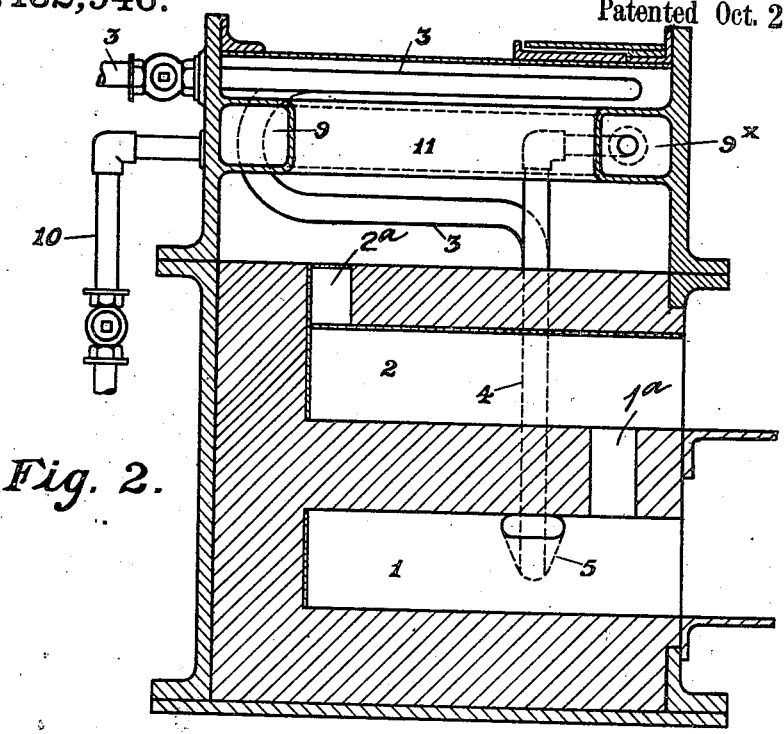
Figure 2 is a vertical section on a plane at right angles to the plane of Figure 1.
Figure 1:
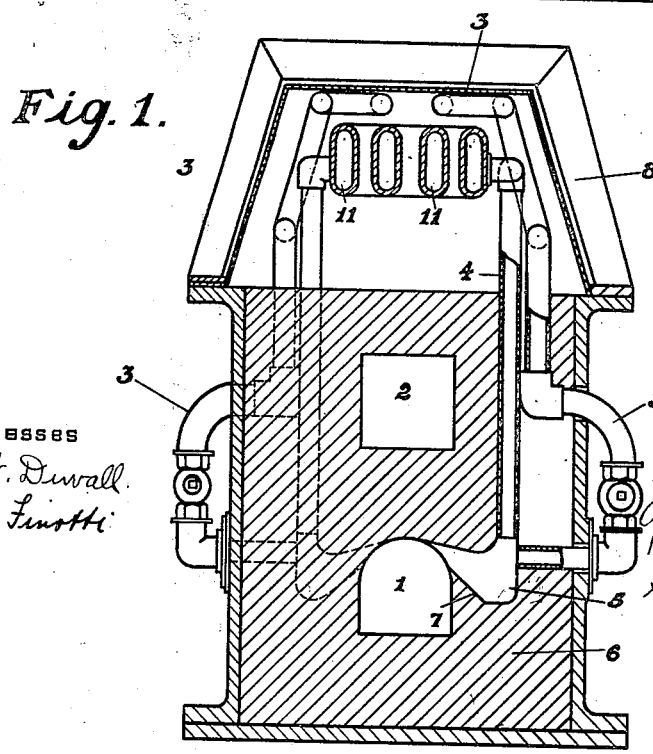
Figure 1 is a cross section of the furnace on a vertical plane.

Referring to these figures, the furnace as applied to hardening or tempering steel tools has as usual twin chambers namely a pre-heating chamber 1 and a hardening chamber 2. The hardening chamber 2 is connected to the pre-heating chamber 1 by a flue 1ª, and the hardening chamber 2 is connected to a chamber or hood thereabove by a flue 2ª. In the preferred form of the invention, as illustrated in the drawings, there are two burners for supplying heat to the heating chamber and hardening chamber. These burners are staggered relative to each other and oppositely disposed. They are similar in construction and the description of one will answer for both, like references being applied to both burners. These burners consist of a gas supply pipe 3, an air supply pipe 4 and a combustion chamber 5. The combustion chamber 5 is inserted in the wall 6 of the furnace, and the gas pipe 3 preferably enters said combustion chamber 5 horizontally while the air supply pipe 4 preferably enters the combustion chamber at right angles to the gas pipe. The essential feature is that the air and the gas pipes shall be at right angles to each other so as to insure that the heated issuing air shall be brought into intimate contact with the heated gases issuing into said combustion chamber at a point where they are burned so as to effect rapid combustion. This combustion chamber 5 which is made with inclined sides so as to be V shape in vertical cross section has a floor 7 which gradually slopes upwards from the end where the pipes deliver the heated air and gas, to the end which communicate with the preheating chamber 1. That is to say the V shaped combustion chamber 5 is deepest at the end where the gas and air enter, and shallowest at the end where the orifice of the combustion chamber delivers the flame into the chamber 1. The gas jet is preferably projected longitudinally towards this orifice while the air jet is projected vertically across the gas jet in order to effect a thorough mixing of the air and gas. The roof of the burner has a rounded corner or baffle between the gas supply jet and the orifice of the combustion chamber so that the said baffle lies in part between the jet and the said orifice, and the gas is deflected out of direct alignment with such orifice.

The gas and air are pre-heated on their way to the combustion chamber, by passing the gas and air pipes through a chamber or hood 8 arranged over the top of the furnace structure itself, through which chamber or hood the out-flowing products of combustion are passed. The gas pipe 3 is passed back and forth through this heating chamber or hood 8, as is also the air pipes 4, those portions of the pipes which are inside the chamber being enlarged if desired to give an extended surface upon which the heat of the combustion products can act so that the gas and air passing through them are heated by the heated metallic surface. In a preferred arrangement, a chamber 9 is cast integral with the inside of the hood 8 at the side thereof to which the cold air supply pipe 10 is connected and a similar chamber 9× is cast integral with the inside of the hood at the opposite side to which the air pipe 4 leading to the combustion chamber is connected, and these two chambers are connected together by conduits 11 spaced apart, the said conduits being of such shape in cross section as to present a good heating surface, the hood 8, chambers 9, 9× and conduits 11 being cast integral. Consequently the cold air entering the one chamber 9 and passing through the conduits 11 into the other chamber 9× is delivered to the combustion chamber 5 in a heated condition, the heat of combustion products passing through the hood 8 being absorbed thereby. The gas pipe 3 is carried through the hood back and forth above the air conduits 11, then downwards to the space under the conduits 11 and thence to the combustion chamber.

As above noted, in the preferred form of the invention, there are two combustion chambers, one built into or inserted in the wall of the furnace at one side, and the other built into or inserted in the wall of the furnace at the opposite side. The conduits 11 inside of the hood 8 are duplicated so as to supply heated gas and air to the respective combustion chambers. It is to be understood, however, that from certain aspects of the invention, only one burner may be required. The operation of my improved furnace is thought to be obvious. The burners heat the chamber 1 and the heated fumes escaping from the flue 1ª into the hardening chamber 2, heat said hardening chamber, and the heated fumes or fuel gases passing from the flue 2ª into the hood or chamber, and in and about the pipes therein, serve to heat the gases and the air that is consumed at the burner. The preheating chamber is readily accessible for articles which are to be preheated, after which they may be placed in the hardening chamber for treatment.

I declare that what I claim is:—

1. A gas fired furnace comprising a heating chamber, a burner for said heating chamber including a combustion chamber having inclined sides and a floor which gradually slopes upwardly toward the open side of the combustion chamber, and air and gas pipes arranged at an angle to each other and connected to said combustion chamber.

2. A gas fired furnace comprising a pre-heating chamber, a hardening chamber, a flue connecting the preheating chamber with the hardening chamber, a burner communicating with the pre-heating chamber and having a combustion chamber with inclined sides and a floor which gradually slopes upwardly toward the open side of the burner and air and gas pipes arranged at an angle to each other and communicating with the combustion chamber.

3. A gas fired furnace for the purposes described comprising a pre-heating chamber, a hardening chamber, a combustion chamber communicating at one end with the pre-heating chamber, and at the other provided with a gas supply pipe entering the chamber horizontally and an air supply pipe entering the chamber at right angles thereto, and a rounded corner or baffle in the roof of the combustion chamber between the gas supply jet and the combustion chamber orifice, so that the said jet is directed out of direct alignment with the said orifice.

4. A gas fired furnace for the purposes described, comprising a pre-heating chamber, a hardening chamber, a combustion chamber communicating at one end with the pre-heating chamber, a chamber or hood arranged over the top of the furnace structure through which hood the hot out flowing products of combustion are passed, gas and air pipes arranged at one part to pass back and forth through this hood so that the gas and air passing through them are preheated, and arranged at the delivery ends to enter the combustion chamber horizontally and perpendicularly respectively so as to ensure that the preheated air shall be brought into intimate contact with the preheated gas.

5. A gas fired furnace for the purposes described comprising a preheating chamber, a hardening chamber, a combustion chamber communicating at one end with the pre-heating chamber, a chamber or hood arranged on top of the furnace structure, through which hood the hot out-flowing products of combustion are passed, a chamber or chambers cast integrally with the inside of the hood to which the cold air pipes are connected, and a similar chamber or chambers cast integrally with the inside of the hood to which the hot air pipes are connected, and spaced conduits for connecting the chambers together such conduits being of such shape as to present a relatively large surface to absorb heat.

6. A gas fired furnace for the purposes described, comprising a pre-heating chamber, a hardening chamber, a combustion chamber communicating at one end with the pre-heating chamber, a chamber or hood arranged on top of the furnace structure, through which hood the hot outflowing combustion products are passed, chambers cast integrally with the inside of the hood to which the cold air admission pipe and the hot air delivery pipe are connected respectively, spaced conduits for connecting the chambers together, and gas pipes carried through the hood back and forth above the air conduits, then downwards to the space under the conduits, and thence to the combustion chamber.

In witness whereof, I have hereunto signed my name this 19th day of May, 1920, in the presence of two subscribing witnesses.

JOHANNES ROBERT CARL AUGUST.

Witnesses:
JOHN McLACHLAN,
F. G. WILLIAMS.